(12) United States Patent
Sada et al.

(10) Patent No.: US 8,882,622 B2
(45) Date of Patent: Nov. 11, 2014

(54) HYBRID DRIVE SYSTEM

(75) Inventors: Natsuki Sada, Anjo (JP); Tomoo Atarashi, Kariya (JP); Hirotaka Yata, Kariya (JP); Tomoaki Nishizuru, Anjo (JP); Michitaka Tsuchida, Miyoshi (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 13/601,759

(22) Filed: Aug. 31, 2012

(65) Prior Publication Data

US 2013/0023369 A1 Jan. 24, 2013

Related U.S. Application Data

(63) Continuation-in-part of application No. PCT/JP2011/053872, filed on Feb. 10, 2011.

(30) Foreign Application Priority Data

Mar. 9, 2010 (JP) .................................. 2010-051859

(51) Int. Cl.
| | |
|---|---|
| *F16H 3/72* | (2006.01) |
| *B60K 6/40* | (2007.10) |
| *B60K 6/445* | (2007.10) |
| *F16H 57/08* | (2006.01) |
| *F16H 37/08* | (2006.01) |

(52) U.S. Cl.
CPC .............. *F16H 3/727* (2013.01); *F16H 57/082* (2013.01); *B60K 6/40* (2013.01); *Y02T 10/6239* (2013.01); *F16H 2037/0866* (2013.01); *B60K 6/445* (2013.01)

USPC .............. 475/5; 475/150; 475/151; 74/606 R; 180/65.22

(58) Field of Classification Search
USPC .................... 475/5, 149–152, 329; 74/606 R; 180/65.22, 65.235; 903/902, 952
See application file for complete search history.

(56) References Cited

U.S. PATENT DOCUMENTS

| | | | |
|---|---|---|---|
| 6,166,498 A | 12/2000 | Yamaguchi et al. | |
| 6,692,394 B2 | 2/2004 | Takenaka | |
| 7,001,296 B2 * | 2/2006 | Yamauchi et al. ................. | 475/5 |
| 8,645,037 B2 | 2/2014 | Kato et al. | |

(Continued)

FOREIGN PATENT DOCUMENTS

| | | |
|---|---|---|
| DE | 101 40 366 A1 | 7/2003 |
| EP | 1 220 423 A2 | 7/2002 |

(Continued)

OTHER PUBLICATIONS

Nov. 8, 2012 English Translation of Japanese Office Action issued in Japanese Patent Application No. 2010-051859.

(Continued)

*Primary Examiner* — Jacob S Scott
(74) *Attorney, Agent, or Firm* — Oliff PLC

(57) ABSTRACT

An electric drive device including an input member drivably coupled to an internal combustion engine, a first rotary electric machine, a second rotary electric machine disposed on an axis different from that of the first rotary electric machine, an output member drivably coupled to wheels and the second rotary electric machine, a power distribution device that distributes torque transferred from the input member to the output member and the first rotary electric machine, and a case.

8 Claims, 5 Drawing Sheets

(56) References Cited

U.S. PATENT DOCUMENTS

| | | |
|---|---|---|
| 2001/0050190 A1 | 12/2001 | Takenaka |
| 2004/0121870 A1 | 6/2004 | Takenaka et al. |
| 2007/0135255 A1 | 6/2007 | Kim et al. |
| 2009/0014222 A1 | 1/2009 | Tatematsu et al. |
| 2009/0023529 A1 | 1/2009 | Sanji et al. |
| 2009/0065274 A1 | 3/2009 | Kano et al. |
| 2009/0098969 A1 | 4/2009 | Tabata et al. |
| 2009/0267352 A1 | 10/2009 | Sada et al. |
| 2009/0295242 A1 | 12/2009 | Yamamoto et al. |
| 2011/0039649 A1 | 2/2011 | Tanae et al. |
| 2011/0113782 A1 | 5/2011 | Tsuchida et al. |
| 2012/0143422 A1* | 6/2012 | Kitahata et al. ............ 475/5 |
| 2012/0329594 A1 | 12/2012 | Sada et al. |
| 2013/0184111 A1 | 7/2013 | Tsuchida et al. |

FOREIGN PATENT DOCUMENTS

| | | |
|---|---|---|
| JP | U-S58-091041 | 6/1983 |
| JP | A-2000-217205 | 8/2000 |
| JP | A-2001-355727 | 12/2001 |
| JP | A-2003-148595 | 5/2003 |
| JP | A-2003-191760 | 7/2003 |
| JP | A-2005-344917 | 12/2005 |
| JP | A-2006-29363 | 2/2006 |
| JP | A-2007-159287 | 6/2007 |
| JP | A-2009-108947 | 5/2009 |
| JP | A-2009-143348 | 7/2009 |
| JP | A-2009-166740 | 7/2009 |
| JP | A-2009-179205 | 8/2009 |
| JP | A-2009-257518 | 11/2009 |
| JP | A-2009-262858 | 11/2009 |
| JP | A-2009-286367 | 12/2009 |
| JP | A-2010-036820 | 2/2010 |
| WO | WO 2009/011240 A1 | 1/2009 |

OTHER PUBLICATIONS

Jun. 16, 2011 International Search Report issued in International Patent Application No. PCT/JP2011/053873.

U.S. Appl. No. 13/582,397, filed Sep. 21, 2012 in the name of Sada et al.

U.S. Appl. No. 13/601,865, filed Aug. 31, 2012 in the name of Sada et al.

U.S. Appl. No. 13/581,589, filed Aug. 28, 2012 in the name of Sada et al.

Partial translation of Japanese Office Action issued in Japanese Patent Application No. 2010-051859 dated Nov. 8, 2012.

International Search Report for International Application No. PCT/JP2011/053872 dated Jun. 16, 2011.

Written Opinion of the International Searching Authority issued in International Application No. PCT/JP2011/053873 dated Jun. 16, 2011.

Partial translation of Japanese Office Action issued in Japanese Patent Application No. 2010-051858 dated Nov. 8, 2012.

Written Opinion of the International Searching Authority issued in International Application No. PCT/JP2011/053872 dated Jun. 16, 2011.

Oct. 25, 2013 Office Action issued in U.S. Appl. No. 13/582,397.
May 22, 2014 Office Action issued in U.S. Appl. No. 13/581,589.
May 6, 2014 Notice of Allowance issued in U.S. Appl. No. 13/582,397.
Mar. 27, 2014 Office Action issued in U.S. Appl. No. 13/601,865.

* cited by examiner

HYBRID DRIVE SYSTEM

This is a Continuation-in-Part of Application No. PCT/JP2011/053872 filed Feb. 10, 2011, which claims the benefit of Japanese Application No. 2010-051859 filed Mar. 9, 2010. The disclosure of the prior application is hereby incorporated by reference herein in its entirety.

INCORPORATION BY REFERENCE

The disclosure of Application No. PCT/JP 2011-053872 filed on Feb. 10, 2011 including the specification, drawings and abstract is incorporated herein by reference in its entirety.

BACKGROUND OF THE INVENTION

The present invention relates to an electric drive device including an input member drivably coupled to an internal combustion engine, a first rotary electric machine, a second rotary electric machine disposed on an axis different from that of the first rotary electric machine, an output member drivably coupled to wheels and the second rotary electric machine, a power distribution device that distributes torque transferred from the input member to the output member and the first rotary electric machine, and a case.

Description of the Related Art

Devices disclosed in Japanese Patent Application Publication No. 2003-191760 (JP 2003-191760 A) and Japanese Patent Application Publication No. 2009-257518 (JP 2009-257518 A) are already known as examples of the electric drive device described above. In the device described in JP 2003-191760 A, an output gear (counter drive gear) coupled to an output member is disposed between an internal combustion engine and a power distribution device in the axial direction. In the device according to JP 2003-191760 A, the output gear is supported by a case via two support bearings disposed on the outer peripheral surfaces on both sides of the output gear in the axial direction. An input member that drivably couples the internal combustion engine and the power distribution device to each other is disposed on the radially inner side of the output gear. The input member is supported by the inner peripheral surface of the output gear.

In the device described in JP 2009-257518 A, a second rotary electric machine is disposed between an internal combustion engine and a power distribution device in the axial direction. In the device according to JP 2009-257518 A, a rotary shaft of the second rotary electric machine is supported by a case via two support bearings disposed on the outer peripheral surfaces on both sides of the rotary shaft in the axial direction. An input member that drivably couples the internal combustion engine and the power distribution device to each other is disposed on the radially inner side of the rotary shaft. The input member is supported by the inner peripheral surface of the rotary shaft.

In the devices according to JP 2003-191760 A and JP 2009-257518 A, however, the output gear, or the second rotary electric machine, and the two support bearings which support the output gear, or the second rotary electric machine, are disposed between the internal combustion engine and the power distribution device in the axial direction, which increases the axial spacing between the internal combustion engine and the power distribution device. This increases the axial length of the input member which drivably couples the internal combustion engine and the power distribution device to each other, which requires the input member to be made thicker in order to maintain strength and tends to increase the axial length of the electric drive device. In the case where torque transferred from the internal combustion engine to the input member becomes larger because of a change of the internal combustion engine, it is necessary to increase the strength of the input member by making the input member thicker, for example. In this case, it is also necessary to change the output gear, or the second rotary electric machine, and the two support bearings, which are disposed on the radially outer side of the input member.

SUMMARY OF THE INVENTION

In view of the foregoing, it is desired to efficiently dispose an input member, an output member, a power distribution device, and bearings that support such components in an electric drive device including two rotary electric machines to suppress the axial length of the device to a short length.

According to an aspect of the present invention, there is provided an electric drive device including an input member drivably coupled to an internal combustion engine, a first rotary electric machine, a second rotary electric machine disposed on an axis different from that of the first rotary electric machine, an output member drivably coupled to wheels and the second rotary electric machine, a power distribution device that distributes torque transferred from the input member to the output member and the first rotary electric machine, and a case. In the electric drive device, the input member, the output member, the power distribution device, and the first rotary electric machine are disposed coaxially with each other, and the output member and the power distribution device are disposed on a side where the internal combustion engine is provided with respect to the first rotary electric machine in an axial direction of the output member. The output member includes a tubular portion provided in at least a part of the output member in the axial direction; the case includes a radially extending portion provided between the power distribution device and the output member and the internal combustion engine in the axial direction to extend in a radial direction of the output member. The radially extending portion is formed such that at least a radially inner end portion of the radially extending portion is positioned on a radially inner side with respect to the tubular portion, and the radially extending portion supports both a first bearing and a second bearing. The first bearing rotatably supports the input member from a radially outer side, and the second bearing rotatably supports the tubular portion of the output member from a radially inner side.

The term "rotary electric machine" as used herein refers to any of a motor (electric motor), a generator (electric generator), and a motor generator that functions both as a motor and as a generator as necessary.

The term "drivably coupled" as used herein refers to a state in which two rotary elements are coupled to each other in such a way that enables transfer of a drive force, and the state includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

The phrase "overlap as viewed in a certain direction" as used herein for the arrangement of two members means that when the viewing direction is determined as the certain direction and the viewpoint is moved in directions orthogonal to the viewing direction, the two members are seen as overlapping each other from at least some viewpoints.

In the aspect described above, the input member is supported from the radially outer side by the first bearing supported by the radially extending portion, and the output member is supported from the radially inner side by the second bearing supported by the radially extending portion. Thus, both the input member and the output member can be supported by the common radially extending portion. This facilitates reducing the axial spacing between the power distribution device and the output member and the internal combustion engine.

In addition, the first rotary electric machine is provided coaxially with the power distribution device and the output member, and disposed opposite to the internal combustion engine side with respect to the power distribution device and the output member. Meanwhile, the second rotary electric machine is disposed on an axis different from that of the power distribution device, the input member, the output member, and the first rotary electric machine. This suppresses widening of the axial spacing between the power distribution device and the internal combustion engine due to the arrangement of the first rotary electric machine and the second rotary electric machine.

In addition, the output member is supported by the second bearing, and the input member is supported by the first bearing. That is, the output member and the input member are supported by different bearings. Hence, in the case where the input member is thickened because of a change of the internal combustion engine, for example, it may be only necessary to change the first bearing, and there may be less need to change the second bearing and the output member supported by the second bearing.

Consequently, it is possible to suppress the axial length of the input member, which drivably couples the internal combustion engine and the power distribution device to each other, to a short length while efficiently disposing the input member, the output member, the power distribution device, and bearings that support such components. This facilitates reducing the thickness of the input member while securing the required strength, and suppressing the axial length of the electric drive device to a short length, which facilitates reducing the size and the weight of the electric drive device.

The first bearing and the second bearing may be disposed so as to overlap each other as viewed in the radial direction.

This configuration facilitates suppressing the axial length of the space for arrangement of the first bearing and the second bearing to a short length. In this event, as described above, the output member is supported by the second bearing from the radially inner side, and the input member is supported by the first bearing from the radially outer side. This facilitates disposing the first bearing and the second bearing at radial positions different from each other so as to overlap each other as viewed in the radial direction.

The power distribution device may be formed by a planetary gear mechanism, and disposed at a position on a radially inner side with respect to the output member and overlap the output member as viewed in the radial direction. An output gear that drivably couples the output member and the wheels to each other may be provided on an outer peripheral surface of the output member, and a ring gear of the planetary gear mechanism may be provided on an inner peripheral surface of the output member. A root circle diameter of the output gear may be larger than both a root circle diameter of the ring gear and an outside diameter of the second bearing.

The second bearing and the ring gear of the planetary gear mechanism are disposed on the inner peripheral surface of the output member. Thus, the output gear provided on the outer peripheral surface of the output member can be disposed at a position overlapping the second bearing and the planetary gear mechanism as viewed in the radial direction. This makes it is possible to secure a high degree of freedom in arrangement of the output gear. In this configuration, further, the root circle diameter of the output gear is larger than both the root circle diameter of the ring gear and the outside diameter of the second bearing. This further enhances the degree of freedom in arrangement of the output gear.

The input member may include an internal combustion engine coupling portion coupled to the internal combustion engine, a distribution coupling portion coupled to the power distribution device, and an extending portion that extends from the distribution coupling portion toward the first rotary electric machine along the axial direction. The extending portion may have a small diameter compared to a region of the input member between the distribution coupling portion and the internal combustion engine coupling portion. A rotary shaft of the first rotary electric machine may include an axial cylindrical portion that is open at an end portion of the rotary shaft on a side where the power distribution device is provided. At least a part of the extending portion may be inserted into the axial cylindrical portion of the rotary shaft of the first rotary electric machine, and supported in the radial direction so as to be rotatable with respect to an inner peripheral surface of the axial cylindrical portion via a bearing.

In this configuration, the input member is supported in the radial direction by the inner peripheral surface of the rotary shaft of the first rotary electric machine also at the extending portion provided on the first rotary electric machine side with respect to the distribution coupling portion. This allows the input member to be supported on both sides with respect to the power distribution device in the axial direction, which facilitates stably supporting the input member. In addition, with the input member also supported on the first rotary electric machine side, a support mechanism for the input member on the internal combustion engine side can be simplified, which facilitates reducing the axial spacing between the power distribution device and the internal combustion engine. Meanwhile, the extending portion of the input member is supported utilizing the inner peripheral surface of the rotary shaft of the first counter bearing. Thus, there is no need to provide a support structure, such as a bearing, exclusively for supporting the extending portion. This facilitates securing the support accuracy for the input member while suppressing the axial length of the electric drive device to a short length.

In addition, the extending portion of the input member has a small diameter. This facilitates reducing the weight of the input member, and also facilitates insertion of the input member into the rotary shaft of the first rotary electric machine. In this event, it is not necessary for the extending portion of the input member to transfer torque between the internal combustion engine and the power distribution device, and the strength of the extending portion can be set to be low, unlike the region of the input member between the distribution coupling portion and the internal combustion engine coupling portion. This facilitates securing the necessary strength of the extending portion even if the extending portion has a small diameter.

DETAILED DESCRIPTION OF THE EMBODIMENTS

An electric drive device 11 according to an embodiment of the present invention will be described with reference to the drawings.

Figure 1:
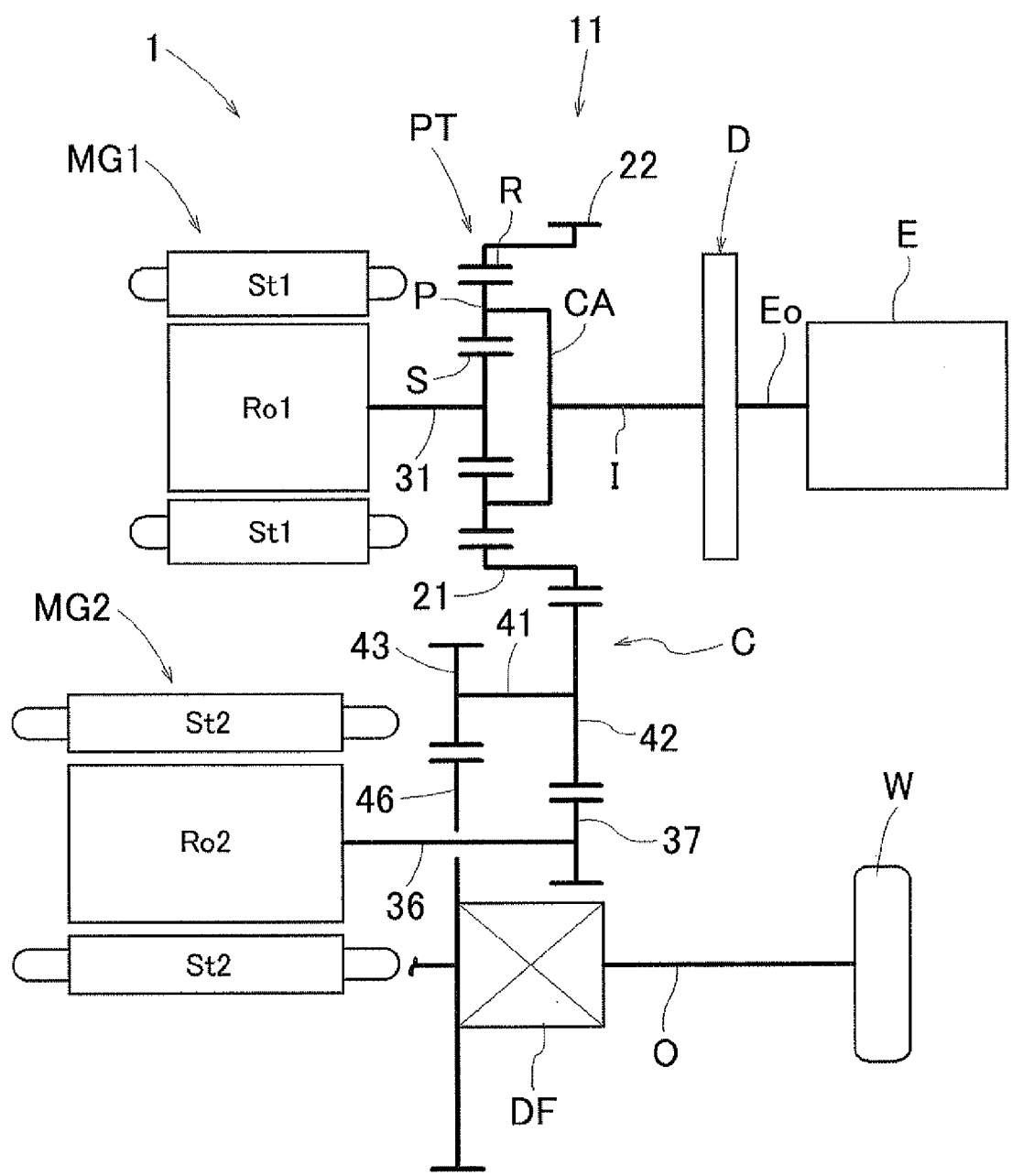
FIG. 1 is a skeleton diagram of a hybrid drive device according to an embodiment of the present invention.
Figure 3:
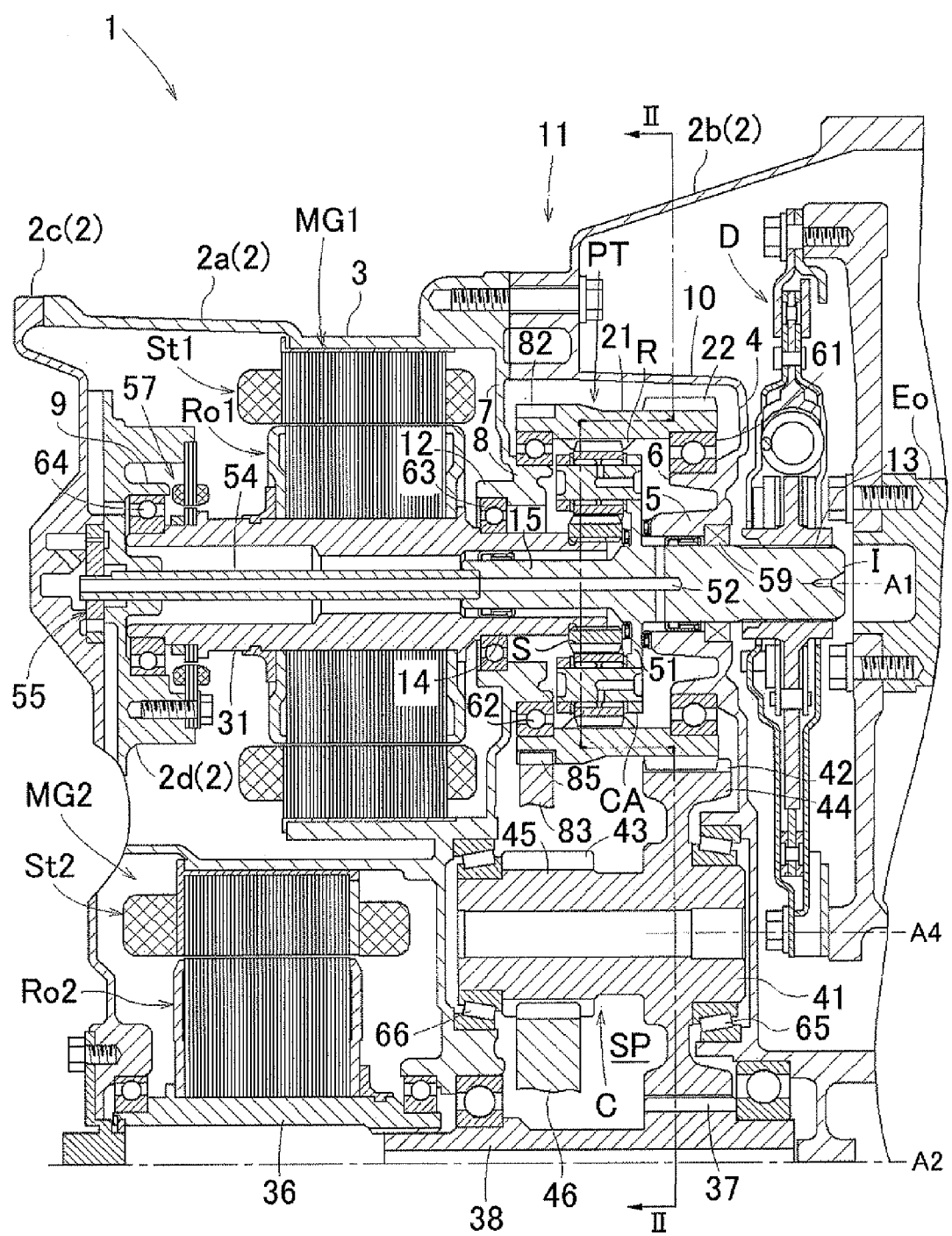
FIG. 3 is a cross-sectional view of the hybrid drive device according to the embodiment of the present invention, developed with respect to the axial direction.
Figure 4:
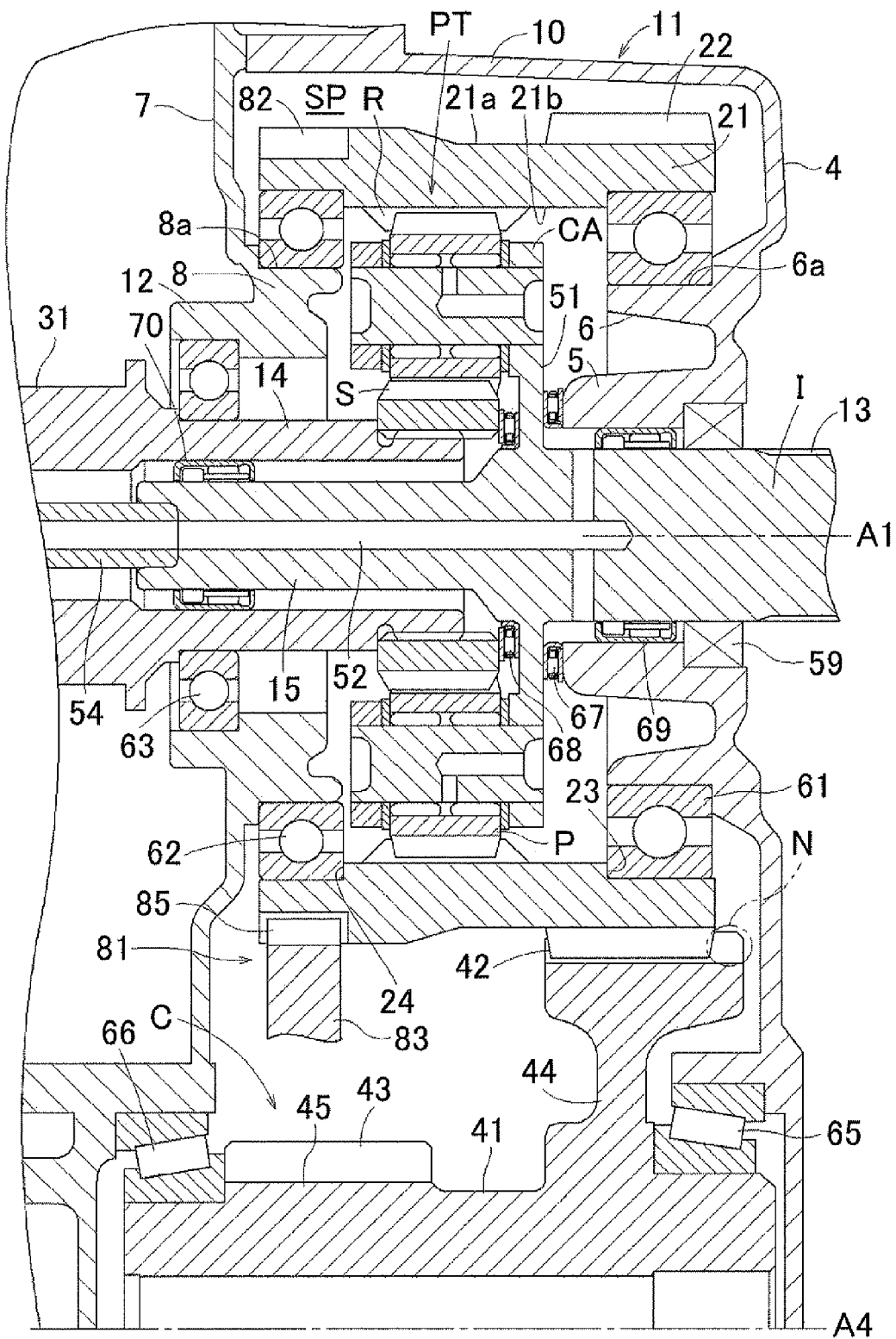
FIG. 4 is a cross-sectional view of an essential portion of the hybrid drive device according to the embodiment of the present invention.

As shown in FIGS. 1, 3, and 4, an electric drive device 11 includes an input shaft I drivably coupled to an engine E, a first rotary electric machine MG1, a second rotary electric machine MG2 disposed on an axis different from that of the first rotary electric machine MG1, a distribution output member 21 drivably coupled to wheels W and the second rotary electric machine MG2, a power distribution device PT that distributes torque transferred from the input shaft I to the distribution output member 21 and the first rotary electric machine MG1, and a case 2. In the embodiment, the power distribution device PT is formed by a planetary gear mechanism. The input shaft I corresponds to the "input member" according to the present invention. The distribution output member 21 corresponds to the "output member" according to the present invention.

The input shaft I, the distribution output member 21, the power distribution device PT, and the first rotary electric machine MG1 are disposed coaxially with a first axis A1, and supported so as to be rotatable about the first axis A1. The distribution output member 21 and the power distribution device PT are disposed on the engine E side with respect to the first rotary electric machine MG1 in the axial direction of the distribution output member 21. In the description below, unless otherwise noted, the terms "axial direction", "radial direction", and "circumferential direction" refer to the axial direction, the radial direction, and the circumferential direction, respectively, with respect to the first axis A1. In the embodiment, a second axis A2, a third axis A3, and a fourth axis A4 are disposed in parallel with the first axis A1. Therefore, the axial direction is common to the axes A2, A3, and A4. The axial direction from the power distribution device PT toward the engine E (toward the right in FIGS. 1, 3, and 4) is defined as "first axial direction", and the opposite direction from the power distribution device PT toward the first rotary electric machine MG1 (toward the left in FIGS. 1, 3, and 4) is defined as "second axial direction".

As shown in FIG. 4, the distribution output member 21 includes a tubular portion provided in at least a part of the distribution output member 21 in the axial direction.

The case 2 includes a first radially extending wall 4 provided between the power distribution device PT and the distribution output member 21 and the engine E in the axial direction to extend in the radial direction of the distribution output member 21. The first radially extending wall 4 is formed such that at least the radially inner end portion of the first radially extending wall 4 is positioned on the radially inner side with respect to the tubular portion.

The first radially extending wall 4 supports both a first input support bearing 69 and a first output support bearing 61. The first input support bearing 69 rotatably supports the input shaft I from the radially outer side. The first output support bearing 61 rotatably supports the tubular portion of the distribution output member 21 from the radially inner side.

The first input support bearing 69 corresponds to the "first bearing" according to the present invention. The first output support bearing 61 corresponds to the "second bearing" according to the present invention.

In the embodiment, the electric drive device 11 forms a part of a hybrid drive device 1. The hybrid drive device 1 is a drive device for a hybrid vehicle that can travel utilizing both the engine E and the rotary electric machines MG1 and MG2 as a drive force source. The hybrid drive device 1 according to the embodiment is disposed adjacent, in the width direction of the vehicle, to the engine E which is transversely mounted on the vehicle, and coupled to an output shaft Eo of the engine E in the axial direction. The hybrid drive device 1 has a configuration that is suitable for front-engine front-drive (FF) vehicles, for example.

The hybrid drive device 1 is formed as a so-called two-motor split type hybrid drive device. In the hybrid drive device 1, the power distribution device PT is configured to distribute torque of the engine E transferred via the input shaft I to the first rotary electric machine MG1 and the distribution output member 21. The second rotary electric machine MG2 is also drivably coupled to an output gear 22 provided to the distribution output member 21 via a counter gear mechanism C.

1. Overall Configuration of Hybrid Drive Device

First, the overall configuration of the hybrid drive device 1 according to the embodiment will be described. As shown in FIGS. 1 and 3, the input shaft I is drivably coupled to the engine E. The engine E is an internal combustion engine driven by combustion of fuel. Various engines known in the art such as a gasoline engine and a diesel engine, for example, may be used as the engine E. In the example, the input shaft I is drivably coupled to the engine output shaft Eo such as a crankshaft of the engine E via a damper D. A configuration in which the input shaft I is drivably coupled to the engine output shaft Eo either via a clutch or the like in addition to the damper D, or directly not via the damper D, a clutch or the like, is also suitable.

The first rotary electric machine MG1 includes a first stator St1 fixed to the case 2 and a first rotor Ro1 supported on the radially inner side of the first stator St1 so as to be freely rotatable. The first rotor Ro1 is drivably coupled to a sun gear S of the power distribution device PT so as to rotate together with the sun gear S. The first rotary electric machine MG1 can function as a motor (electric motor) that is supplied with electric power to produce power and as a generator (electric generator) that is supplied with power to produce electric power. Therefore, the rotary electric machine MG1 is electrically connected to an electricity accumulation device (not shown). In the example, a battery is used as the electricity accumulation device. A capacitor or the like may also be suitably used as the electricity accumulation device. In the example, the first rotary electric machine MG1 mainly functions as a generator that generates electric power using torque of the input shaft I (engine E) input via the power distribution device PT to supply electric power for charging a battery or driving the second rotary electric machine MG2. It should be noted, however, that the first rotary electric machine MG1 occasionally functions as a motor that performs power running to output a drive force when the vehicle is traveling at a high speed or when the engine E is started, for example.

The second rotary electric machine MG2 includes a second stator St2 fixed to the case 2 and a second rotor Ro2 supported on the radially inner side of the second stator St2 so as to be freely rotatable. The second rotor Ro2 is drivably coupled to a second rotary electric machine output gear 37 so as to rotate together with the second rotary electric machine output gear 37. The second rotary electric machine MG2 can function as a motor (electric motor) that is supplied with electric power to produce power and as a generator (electric generator) that is supplied with power to produce electric power. Therefore, the rotary electric machine MG2 is also electrically connected to the battery serving as the electricity accumulation device. In the example, the second rotary electric machine MG2 mainly functions as a motor that supplements a drive force for driving the vehicle. It should be noted, however, that the second rotary electric machine MG2 occasionally functions as a generator that regenerates an inertial force of the vehicle into electrical energy when the vehicle is decelerated, for example.

In the embodiment, the power distribution device PT is a single-pinion planetary gear mechanism disposed coaxially with the input shaft I. That is, the power distribution device PT includes three rotary elements, namely a carrier CA that supports a plurality of pinion gears P, and the sun gear S and a ring gear R that each mesh with the pinion gears P. The sun gear S is drivably coupled to a first rotor shaft 31 of the first rotor Ro1 of the first rotary electric machine MG1 so as to rotate together with the first rotor shaft 31. The carrier CA is drivably coupled to the input shaft I so as to rotate together with the input shaft I. The ring gear R is formed integrally with the distribution output member 21. The three rotary elements of the power distribution device PT are the sun gear S (first rotary element), the carrier CA (second rotary element), and the ring gear R (third rotary element) in the order of rotational speed. The term "order of rotational speed" may refer to either of an order from the high speed side to the low speed side and an order from the low speed side to the high speed side depending on the rotating state of the planetary gear mechanism forming the power distribution device PT. In either case, the order of the rotary elements is invariable.

The power distribution device PT distributes torque of the engine E transferred to the input shaft I to the first rotary electric machine MG1 and the distribution output member 21. In the power distribution device PT, the input shaft I is drivably coupled to the carrier CA which is at the middle in the order of rotational speed. The first rotor Ro1 of the first rotary electric machine MG1 is drivably coupled to the sun gear S which is at one end in the order of rotational speed. The ring gear R which is at the other end in the order of rotational speed is formed integrally with the distribution output member 21. In the hybrid drive device 1 according to the embodiment, torque of the engine E in the positive direction is transferred via the input shaft I to the carrier CA which is at the middle in the order of rotational speed, and torque output from the first rotary electric machine MG1 in the negative direction is transferred via the first rotor shaft 31 to the sun gear S which is at one end in the order of rotational speed. Torque of the first rotary electric machine MG1 in the negative direction functions to receive a reaction force of torque of the engine E. This allows the power distribution device PT to distribute part of torque of the engine E, which is transferred to the carrier CA via the input shaft I, to the first rotary electric machine MG1, and to transfer torque, which has been attenuated with respect to torque of the engine E, to the distribution output member 21 via the ring gear R.

In the embodiment, the distribution output member 21 is a generally cylindrical member provided to surround the radially outer side of the power distribution device PT. The ring gear R of the power distribution device PT is formed integrally with an inner peripheral surface 21b of the distribution output member 21. In addition, the output gear 22 is formed integrally with an outer peripheral surface 21a of the distribution output member 21. That is, in the embodiment, the ring gear R of the power distribution device PT and the output gear 22 are formed integrally with the inner peripheral surface 21b and the outer peripheral surface 22a, respectively, of the distribution output member 21. This enables torque transferred to the distribution output member 21 via the ring gear R of the power distribution device PT to be output to the wheels W side via the output gear 22.

The hybrid drive device 1 according to the embodiment further includes the counter gear mechanism C. The counter gear mechanism C reverses the rotational direction of the output gear 22, and transfers torque output from the output gear 22 further to the wheels W side. The counter gear mechanism C includes a counter shaft 41, a first gear 42, and a second gear 43. The first gear 42 meshes with the output gear 22. The first gear 42 also meshes with the second rotary electric machine output gear 37 at a circumferential position different from that for the output gear 22. The second gear 43 meshes with a differential input gear 46 of an output differential gear device DF to be discussed later. Thus, the counter gear mechanism C reverses the rotational direction of the output gear 22 and the second rotary electric machine output gear 37, and transfers torque transferred to the output gear 22 and torque of the second rotary electric machine MG2 to the output differential gear device DF.

The hybrid drive device 1 according to the embodiment further includes the output differential gear device DR The output differential gear device DF includes the differential input gear 46, and distributes torque transferred to the differential input gear 46 to the plurality of wheels W. In the example, the output differential gear device DF is a differential gear mechanism that uses a plurality of bevel gears that mesh with each other, and distributes torque transferred to the differential input gear 46 via the second gear 43 of the counter gear mechanism C to the two, left and right, wheels W via respective axles O. In this event, the output differential gear device DF transfers rotation of the second gear 43 to the wheels W while reversing the rotational direction of the second gear 43. This allows the hybrid drive device 1 to rotate the wheels W in the same direction as the rotational direction of the input shaft 1 (engine E), and to transfer torque in the same direction as that of the input shaft (engine E) and the second rotary electric machine MG2 to the wheels W, to drive the vehicle forward.

Figure 2:
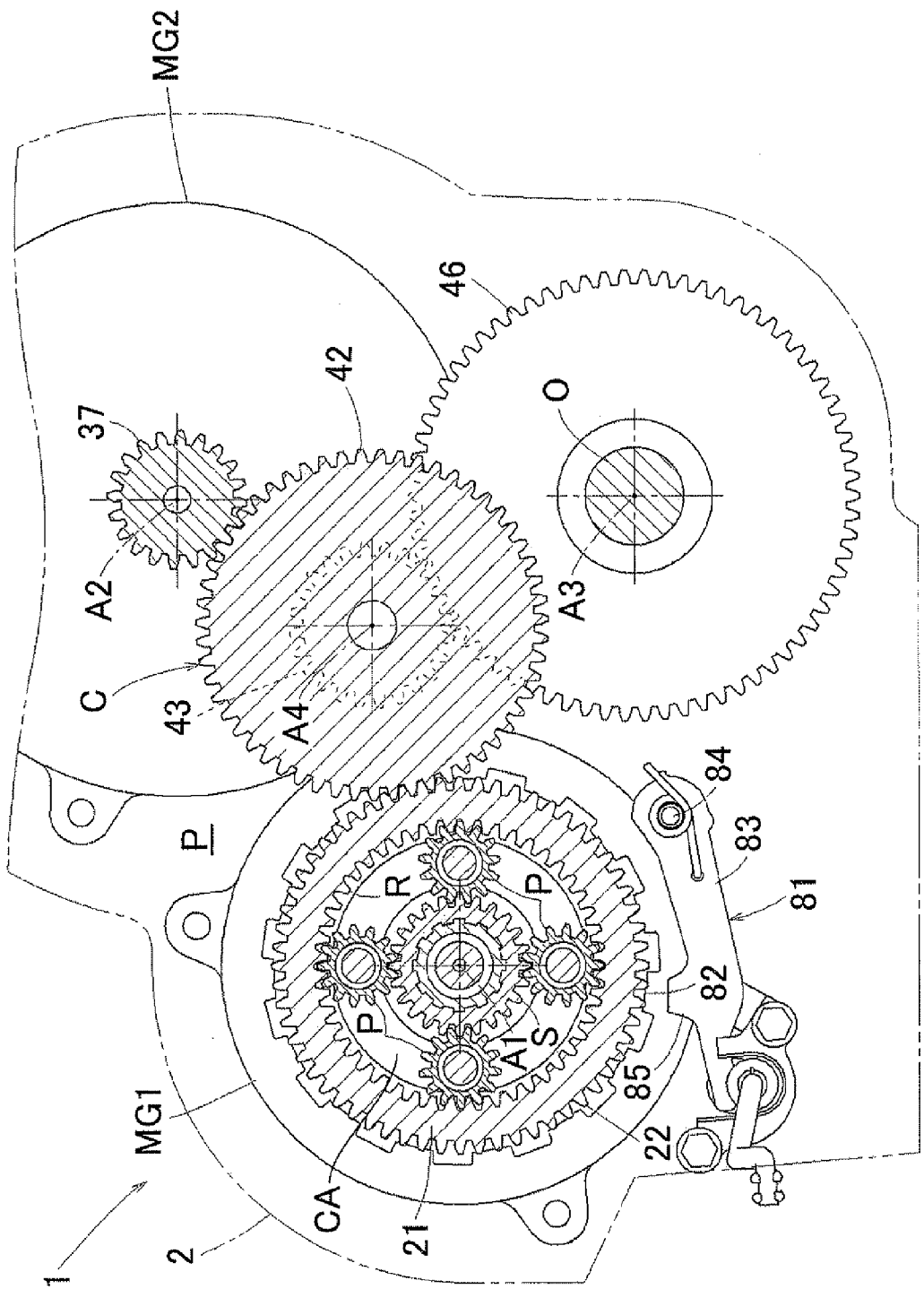
FIG. 2 is a cross-sectional view of the hybrid drive device according to the embodiment of the present invention in a plane orthogonal to the axial direction of the hybrid drive device.

As shown in FIG. 2, the hybrid drive device 1 according to the embodiment has a four-axis configuration in which the first axis Al on which the input shaft 1, the power distribution device PT, and the first rotary electric machine MG1 are disposed, the second axis A2 on which the second rotary electric machine MG2 is disposed, the third axis A3 on which the output differential gear device DF is disposed, and the fourth axis A4 on which the counter gear mechanism C is disposed are provided separately. The first axis Al, the second axis A2, the third axis A3, and the fourth axis A4 are disposed in parallel with each other. In the illustrated example, the first axis Al, the second axis A2, and the third axis A3 are disposed such that lines connecting the axes form a triangle as seen from the axial direction, with the fourth axis A4 disposed inside the triangle as seen from the axial direction.

2. Mechanical Configuration of Various Components of Hybrid Drive Device

Next, the mechanical configuration of various components of the hybrid drive device 1 according to the embodiment will be described. In particular, the mechanical configuration of various constituent parts of the electric drive device 11 will be described in detail. The input shaft I, the first rotary electric machine MG1, the second rotary electric machine MG2, the power distribution device PT, the distribution output member 21, the output gear 22, the counter gear mechanism C, and the output differential gear device DF discussed above are housed in the case 2. In the embodiment, as shown in FIG. 3, the case 2 can be divided into a case body 2a, a front cover 2b attached to a first axial direction side of the case body 2a, and a rear cover 2c attached to a second axial direction side of the case body 2a. These are fastened to each other using fastening members such as bolts.

The case body 2a mainly houses the first rotary electric machine MG1 and the second rotary electric machine MG2. A housing space SP is formed between the case body 2a and the front cover 2b, and mainly houses the input shaft I, the power distribution device PT, the distribution output member 21, the output gear 22, the counter gear mechanism C, and the output differential gear device DF. The case body 2a includes a case peripheral wall 3 formed in an odd tubular shape to cover at least the outer periphery of the first rotary electric machine MG1 and the second rotary electric machine MG2, and a second radially extending wall 7 that blocks an end opening of the case peripheral wall 3 on the first axial direction side. The case peripheral wall 3 and the second radially extending wall 7 are formed integrally with each other. The front cover 2b includes a partition wall 10 formed in an odd tubular shape to cover at least the outer periphery of the power distribution device PT, the distribution output member 21, the output gear 22, the counter gear mechanism C, and the output differential gear device DF, and a first radially extending wall 4 that blocks an end opening of the partition wall 10 on the first axial direction side. The partition wall 10 and the first radially extending wall 4 are formed integrally with each other. The rear cover 2c is formed as a generally flat plate member having a shape corresponding to the outer shape of the case peripheral wall 3 to block an end opening of the case peripheral wall 3 of the case body 2a on the second axial direction side.

The first radially extending wall 4 is formed between the power distribution device PT and the distribution output member 21 and the engine E in the axial direction to extend at least in the radial direction. The first radially extending wall 4 is formed on the first axial direction side with respect to the distribution output member 21 to extend in the radial direction, and formed such that the radially inner end portion of the first radially extending wall 4 is positioned on the radially inner side with respect to the distribution output member 21. In the embodiment, the first radially extending wall 4 is provided on the first axial direction side with respect to the distribution output member 21 to extend in the radial direction from the radially outer side to the radially inner side with respect to the distribution output member 21. In addition, the first radially extending wall 4 extends in the radial direction and the circumferential direction. The first radially extending wall 4 supports both the first input support bearing 69, which rotatably supports the input shaft I from the radially outer side, and the first output support bearing 61, which rotatably supports the distribution output member 21 from the radially inner side.

The first radially extending wall 4 includes a first output projecting portion 6 provided on the radially inner side with respect to the distribution output member 21 to project in the axial direction (second axial direction) from the first radially extending wall 4 toward the distribution output member 21. The first output support bearing 61 is provided on an outer peripheral surface 6a of the first output projecting portion 6. In the embodiment, the first output projecting portion 6 and the first output support bearing 61 are formed in a cylindrical shape.

A through hole in the axial direction is formed in the radially inner portion (center portion) of the first radially extending wall 4. The input shaft I, which is inserted through the through hole, penetrates through the first radially extending wall 4 to be inserted into the case 2. The first radially extending wall 4 includes a first input projecting portion 5 that projects in the axial direction from the radially inner end portion of the first radially extending wall 4. The first input support bearing 69 is provided on the inner peripheral surface of the first input projecting portion 5. In the embodiment, the first input projecting portion 5 is formed to project in the axial direction (second axial direction) from the first radially extending wall 4 toward the distribution output member 21. The first input projecting portion 5 is disposed on the radially inner side with respect to the first output projecting portion 6 to overlap the first output projecting portion 6 as viewed in the radial direction. In addition, the first input projecting portion 5 and the first input support bearing 69 are formed in a cylindrical shape. The first input projecting portion 5 and the first output projecting portion 6 are formed to project in the second axial direction from the first radially extending wall 4 to a position overlapping the distribution output member 21 as viewed in the radial direction.

The second radially extending wall 7 is formed between the power distribution device PT and the distribution output member 21 and the first rotary electric machine MG1 in the axial direction to extend at least in the radial direction. The second radially extending wall 7 is formed on the second axial direction side with respect to the distribution output member 21 to extend in the radial direction, and formed such that the radially inner end portion of the second radially extending wall 7 is positioned on the radially inner side with respect to the distribution output member 21. In the embodiment, the second radially extending wall 7 is provided on the second axial direction side with respect to the distribution output member 21 to extend in the radial direction from the radially outer side to the radially inner side with respect to the distribution output member 21. In addition, the second radially extending wall 7 extends in the radial direction and the circumferential direction. The second radially extending wall 7 supports both a first rotary electric machine bearing 63, which rotatably supports the first rotor shaft 31 of the first rotary electric machine MG1 from the radially outer side, and a second output support bearing 62, which rotatably supports the distribution output member 21 from the radially inner side.

The second radially extending wall 7 includes a second output projecting portion 8 provided on the radially inner side with respect to the distribution output member 21 to project in the axial direction (first axial direction) from the second radially extending wall 7 toward the distribution output member 21. The second output support bearing 62 is provided on an outer peripheral surface 8a of the second output projecting portion 8. In the embodiment, the second output projecting portion 8 and the second output support bearing 62 are formed in a cylindrical shape.

A through hole in the axial direction is formed in the radially inner portion (center portion) of the second radially extending wall 7. The first rotor shaft 31 of the first rotary electric machine MG1, which is inserted through the through hole, penetrates through the second radially extending wall 7 to be coupled to the sun gear S, which serves as a rotary element of the power distribution device, in the housing space SP. The second radially extending wall 7 further includes a second input projecting portion 12 that projects in the axial direction from the radially inner end portion of the second radially extending wall 7. The first rotary electric machine bearing 63 is provided on the inner peripheral surface of the second input projecting portion 12. In the embodiment, the second input projecting portion 12 is formed to project in the axial direction (second axial direction) from the second radially extending wall 7 toward the first rotary electric machine MG1. In addition, the second input projecting portion 12 and the first rotary electric machine bearing 63 are formed in a cylindrical shape. The second output projecting portion 8 is formed to project in the first axial direction from the second radially extending wall 7 to a position overlapping the distribution output member 21 as viewed in the radial direction.

As shown in FIG. 3, a pump cover 2d is attached to an end surface of the rear cover 2c on the first axial direction side, which is the inner side of the case 2. The pump cover 2d is brought into abutment with the rear cover 2c from the first axial direction side to be fastened to the rear cover 2c using fastening members such as bolts. A pump chamber is formed between the rear cover 2c and the pump cover 2d. An oil pump 55 is disposed in the pump chamber. In the embodiment, an internal gear pump having an inner rotor and an outer rotor is used as the oil pump 55. In the embodiment, the inner rotor of the oil pump 55 is driven by a pump drive shaft 54 having a pipe shape and being coupled to the input shaft I so as to rotate together with the input shaft I. Oil discharged from the oil pump 55 is supplied to the power distribution device PT, a plurality of gears, and a plurality of bearings through an in-shaft oil passage 52 formed in radially inner portions of the pump drive shaft 54 and the input shaft I to lubricate and cool such components. The pump cover 2d includes an axially projecting portion 9 having a cylindrical shape (boss shape) and projecting in the first axial direction (toward the first rotary electric machine MG1, which is the inner side of the case 2). The axially projecting portion 9 is formed integrally with the pump cover 2d.

The input shaft I allows torque of the engine E to be input to the hybrid drive device 1. As shown in FIGS. 3 and 4, the input shaft I is coupled to the engine E at an engine coupling portion 13 provided around an end portion of the input shaft I on the first axial direction side. The input shaft I is disposed to penetrate through the case 2. The input shaft I is coupled to the engine output shaft Eo of the engine E via the damper D at a position on the first axial direction side of the first radially extending wall 4 so as to rotate together with the engine output shaft Eo. Spline grooves are formed in the outer peripheral surface of the engine coupling portion 13 to allow the engine coupling portion 13 to be splined to the damper D. The damper D is a device that transfers rotation of the engine output shaft Eo to the input shaft I while attenuating torsional vibration of the engine output shaft Eo. Various dampers known in the art may be used as the damper D. In the embodiment, the damper D is symmetric in the axial direction, and shaped to become thinner in the axial direction from the input shaft I toward the radially outer side. The input shaft I is supported by the first input projecting portion 5 of the first radially extending wall 4 so as to be rotatable via the first input support bearing 69. An oil seal 59 is disposed between the first radially extending wall 4 and the input shaft I to suppress leakage of oil to the first axial direction side (toward the damper D and the engine E).

The input shaft I includes a distribution coupling portion 51 to be coupled to the power distribution device PT. The distribution coupling portion 51 is provided on the first axial direction side of the power distribution device PT, and formed in the shape of a flange extending radially outward from the shaft body portion of the input shaft I. In the example, the distribution coupling portion 51 forms the carrier CA of the power distribution device PT. The distribution coupling portion 51 is formed integrally with the input shaft I. The distribution coupling portion 51 passes through a space between the sun gear S and the first input projecting portion 5 of the first radially extending wall 4 to be coupled to the carrier CA serving as a rotary element of the power distribution device PT. The first input projecting portion 5 of the first radially extending wall 4 and the sun gear S are in abutment with the distribution coupling portion 51 from both sides in the axial direction via a first thrust bearing 67 and a second thrust bearing 68, respectively. That is, the first thrust bearing 67 is disposed between an end surface of the distribution coupling portion 51 on the first axial direction side and an end surface of the first input projecting portion 5 on the second axial direction side to contact the end surfaces. In addition, the second thrust bearing 68 is disposed between an end surface of the distribution coupling portion 51 on the second axial direction side and an end surface of the sun gear S on the first axial direction side to contact the end surfaces.

The input shaft I includes an extending portion 15 that extends from the distribution coupling portion 51 toward the first rotary electric machine MG1 (in the second axial direction) along the axial direction. The extending portion 15 has a small diameter compared to a region of the input shaft I between the distribution coupling portion 51 and the engine coupling portion 13. The first rotor shaft 31 of the first rotary electric machine MG1 includes an axial cylindrical portion 14 that is open at an end portion of the first rotor shaft 31 on the first axial direction side (the power distribution device PT side). The extending portion 15 of the input shaft I is inserted into the axial cylindrical portion 14. The extending portion 15 is supported in the radial direction so as to be rotatable with respect to the inner peripheral surface of the axial cylindrical portion 14 via a second input support bearing 70.

The first rotor shaft 31 allows torque of the first rotary electric machine MG1 to be input to the sun gear S serving as a rotary element of the power distribution device PT (or allows torque transferred to the sun gear S to be input to the first rotary electric machine MG1). As shown in FIGS. 3 and 4, the first rotor shaft 31 is splined to the sun gear S at an end portion of the first rotor shaft 31 on the first axial direction side. The first rotor shaft 31 is supported by the second input projecting portion 12, which forms the radially inner end portion of the second radially extending wall 7, so as to be rotatable via the first rotary electric machine bearing 63. In other words, the first rotary electric machine bearing 63 is supported by the radially inner end portion of the second radially extending wall 7, and supports the first rotor shaft 31 from the radially outer side so as to be rotatable with respect to the second radially extending wall 7. In addition, the first rotor shaft 31 is supported by the axially projecting portion 9 of the pump cover 2d at an axial position different from that of the first rotary electric machine bearing 63 (in the example, at an end portion of the first rotor shaft 31 on the second axial direction side) so as to be rotatable via a second rotary electric machine bearing 64. In the embodiment, a rotation sensor 57 that detects the rotational phase of the first rotor Ro1 of the first rotary electric machine MG1 is disposed so as to surround the first rotor shaft 31. The rotation sensor 57 is disposed adjacently on the first axial direction side of the pump cover 2d and the second rotary electric machine bearing 64 in the axial direction. A resolver or the like may be used as the rotation sensor 57.

The distribution output member 21 includes a tubular portion provided in at least a part of the distribution output member 21 in the axial direction. The output gear 22 which drivably couples the distribution output member 21 and the wheels W to each other is provided on the outer peripheral surface 21a of the distribution output member 21. The ring gear R of the power distribution device PT is provided on the inner peripheral surface 21b of the distribution output member 21. In the embodiment, the distribution output member 21 is formed in a cylindrical shape over the entirety of the distribution output member 21 in the axial direction. The distribution output member 21 according to the example is formed such that at least a part of the distribution output member 21 in the thickness direction occupies the same radial position at all the axial positions from an end portion on the first axial direction side to an end portion on the second axial direction side. The distribution output member 21 is disposed on the radially outer side of the power distribution device PT so as to surround the power distribution device PT. The ring gear R and the output gear 22 are formed integrally with the distribution output member 21. At least one of the output gear 22 and the ring gear R is formed by a helical gear. In the embodiment, both the output gear 22 and the ring gear R are formed by a helical gear.

The ring gear R is formed around the center portion of the distribution output member 21 in the axial direction. Constituent elements of the power distribution device PT such as the pinion gears P, the carrier CA, and the sun gear S are disposed on the radially inner side of the ring gear R. That is, the power distribution device PT is disposed such that the entirety of the power distribution device PT is on the radially inner side of the distribution output member 21 and overlaps the distribution output member 21 as viewed in the radial direction. The distribution output member 21 includes two stepped portions 23 and 24 in the axial direction provided around both end portions of the inner peripheral surface 21b in the axial direction. The term "stepped portions in the axial direction" provided on the inner peripheral surface refers to portions formed at predetermined axial positions of the distribution output member 21 at which the inside diameter of the distribution output member 21 is varied. The inside diameter of a portion provided between the two stepped portions 23 and 24 in the axial direction is smaller than the inside diameter of portions provided on the axially outer side of the two stepped portions 23 and 24. The ring gear R is formed on the smaller-diameter portion of the inner peripheral surface 21b of the distribution output member 21. On the other hand, the inside diameter of portions provided on the axially outer side (first axial direction side and second axial direction side) of the two stepped portions 23 and 24 is larger than the inside diameter of a portion provided between the two stepped portions 23 and 24 in the axial direction. The output support bearings 61 and 62 are disposed on the two large-diameter portions of the inner peripheral surface 21b of the distribution output member 21, respectively. The two output support bearings 61 and 62 are disposed so as to abut against the stepped portions 23 and 24, respectively, from the axially outer side (first axial direction side and second axial direction side).

The distribution output member 21 is supported so as to be rotatable with respect to the case 2 via the two output support bearings 61 and 62. The two output support bearings 61 and 62 are disposed separately on both sides with respect to the ring gear R and the power distribution device PT in the axial direction. The two output support bearings 61 and 62 are disposed between the inner peripheral surface 21b of the distribution output member 21 and the outer peripheral surfaces 6a and 8a of the output projecting portions 6 and 8, respectively. The two output support bearings 61 and 62 support the distribution output member 21 from the radially inner side so as to be rotatable with respect to the output projecting portions 6 and 8. That is, the first output support bearing 61 is disposed between a portion of the inner peripheral surface 21b of the distribution output member 21 on the first axial direction side with respect to the power distribution device PT and the first output projecting portion 6 disposed on the radially inner side of the portion of the inner peripheral surface 21b. The second output support bearing 62 is disposed between a portion of the inner peripheral surface 21b of the distribution output member 21 on the second axial direction side with respect to the power distribution device PT and the second output projecting portion 8 disposed on the radially inner side of the portion of the inner peripheral surface 21b. In the embodiment, the end surface of the first output support bearing 61 on the first axial direction side is disposed at the same axial position as the end surface of the inner peripheral surface 21b on the first axial direction side, and the end surface of the second output support bearing 62 on the second axial direction side is disposed at the same axial position as the end surface of the inner peripheral surface 21b on the second axial direction side. In this way, the distribution output member 21 is supported by the two output support bearings 61 and 62 from the radially inner side so as to be rotatable with respect to the first output projecting portion 6 of the first radially extending wall 4 and the second output projecting portion 8 of the second radially extending wall 7, which are disposed to face each other in the housing space SP. With the distribution output member 21 thus supported from the radially inner side, the diameter of the two output support bearings 61 and 62 can be reduced compared to a configuration in which the distribution output member 21 is supported from the radially outer side.

A bearing of a type that can receive a radial load and a thrust load is used as the two output support bearings 61 and 62. The term "radial load" refers to a load in the radial direction. The term "thrust load" refers to a load in the axial direction. In the embodiment, an angular contact ball bearing is used as the two output support bearings 61 and 62. The first output support bearing 61 is disposed such that the radially outer portion of an end surface of the first output support bearing 61 on the second axial direction side abuts against the stepped portion 23 of the inner peripheral surface 21b of the distribution output member 21 from the first axial direction side, and such that the radially inner portion of an end surface of the first output support bearing 61 on the first axial direction side abuts against the first radially extending wall 4 from the second axial direction side. Therefore, the first output support bearing 61 is disposed so as to receive a thrust load in the first axial direction from the distribution output member 21.

Meanwhile, the second output support bearing 62 is disposed such that the radially outer portion of an end surface of the second output support bearing 62 on the first axial direction side abuts against the stepped portion 24 of the inner peripheral surface 21b of the distribution output member 21 from the second axial direction side, and such that the radially inner portion of an end surface of the second output support bearing 62 on the second axial direction side abuts against the second radially extending wall 7 from the first axial direction side. Therefore, the second output support bearing 62 is disposed so as to receive a thrust load in the second axial direction from the distribution output member 21. The thrust load acting on the distribution output member 21 is caused by the output gear 22 and the ring gear R, at least one of which is formed by a helical gear. In the case where the distribution output member 21 is subjected to a thrust load in the first axial direction as a whole, the thrust load is received by the first output support bearing 61. In the case where the distribution output member 21 is subjected to a thrust load in the second axial direction, on the contrary, the thrust load is received by the second output support bearing 62. That is, different output support bearings receive a thrust load depending on the direction of the thrust load.

The angle of the teeth of one or both of the output gear 22 and the ring gear R is set such that the distribution output member 21 is subjected to a thrust load in the direction opposite to the side on which the output gear 22 is disposed with respect to the axially central position of the distribution output member 21 as a whole. In the embodiment, the output gear 22 is disposed on the first axial direction side with respect to the axially central position of the distribution output member 21. Thus, the angle of the teeth of the output gear 22 and the ring gear R is set such that the distribution output member 21 is subjected to a thrust load in the second axial direction as a whole.

The output gear 22 is disposed so as to overlap at least one of the two output support bearings 61 and 62 and the power distribution device PT as viewed in the radial direction. In the embodiment, the output gear 22 is disposed so as to overlap the first output support bearing 61 as viewed in the radial direction. In addition, the output gear 22 is disposed between an end surface of the first output support bearing 61 on the first axial direction side and an end surface of the second output support bearing 62 on the second axial direction side in the axial direction. In the embodiment, an end surface of the output gear 22 on the first axial direction side is disposed close to end surfaces of the first output support bearing 61 and the distribution output member 21 on the first axial direction side.

The root circle diameter of the output gear 22 is larger than both the outside diameter of the two output support bearings 61 and 62 and the root circle diameter of the ring gear R of the power distribution device PT. That is, the output gear 22 is disposed on the radially outer side with respect to the two output support bearings 61 and 62 and the power distribution device PT.

A fixation gear 82 is provided on the outer peripheral surface 21a of the distribution output member 21 at a position different from that of the output gear 22. The fixation gear 82 is engaged with a fixation member 83 that fixes the distribution output member 21 to the case 2. In the embodiment, a fixation mechanism 81 formed by the fixation gear 82 and the fixation member 83 serves as a parking lock mechanism for the vehicle.

In the embodiment, the fixation gear 82 is disposed so as to overlap the second output support bearing 62 as viewed in the radial direction, and disposed close to end surfaces of the distribution output member 21 and the second output support bearing 62 on the second axial direction side.

As with the output gear 22, the root circle diameter of the fixation gear 82 is larger than both the outside diameter of the two output support bearings 61 and 62 and the root circle diameter of the ring gear R of the power distribution device PT. That is, the fixation gear 82 is disposed on the radially outer side with respect to the two output support bearings 61 and 62 are the power distribution device PT.

In the embodiment, as shown in FIG. 2, the fixation mechanism 81 includes the fixation member 83 which is swingable about a predetermined swing fulcrum 84. The fixation member 83 is formed integrally with a lug portion 85. The fixation member 83 and the lug portion 85 are swung within a predetermined movable range through a cam mechanism or the like (not shown). With the lug portion 85 meshing with the fixation gear 82 so that the lug portion 85 and the fixation gear 82 are engaged with each other, the fixation mechanism 81 forcibly stops rotation of the distribution output member 21. With the lug portion 85 not meshing with the fixation gear 82 so that the lug portion 85 and the fixation gear 82 are disengaged from each other, the fixation mechanism 81 permits rotation of the distribution output member 21.

A second rotor shaft 36 allows a drive force of the second rotary electric machine MG2 to be input to the second rotary electric machine output gear 37 which is formed integrally with a shaft member 38. As shown in FIG. 3, the inner peripheral surface of an end portion of the second rotor shaft 36 on the first axial direction side is splined to the outer peripheral surface of an end portion of the shaft member 38 on the second axial direction side. The second rotor shaft 36 and the shaft member 38, which rotate together with each other, are supported by the case 2 so as to be rotatable via a plurality of bearings at a plurality of positions in the axial direction. Although not shown, a rotation sensor, such as a resolver, that detects the rotational phase of the second rotor Ro2 of the second rotary electric machine MG2 is provided so as to surround the second rotor shaft 36.

The first gear 42 and the second gear 43 forming the counter gear mechanism C are formed integrally with the counter shaft 41. This allows the counter shaft 41, the first gear 42, and the second gear 43 to rotate together with each other. In the embodiment, the second gear 43 is disposed on the second axial direction side with respect to the first gear 42. In addition, the counter shaft 41 is supported so as to be rotatable with respect to the case 2 at a plurality of locations (in the embodiment, two locations) in the axial direction. In the example, the counter shaft 41 is supported so as to be rotatable with respect to the case 2 via a first counter bearing 65 at an end portion of the counter shaft 41 on the first axial direction side and via a second counter bearing 66 at an end portion of the counter shaft 41 on the second axial direction side. A first gear support member 44 that supports the first gear 42 is disposed adjacently on the second axial direction side with respect to the first counter bearing 65. A second gear support member 45 that supports the second gear 43 is disposed adjacently on the first axial direction side with respect to the second counter bearing 66. The number of teeth of the second gear 43 is set to be smaller than the number of teeth of the first gear 42. The gear ratio (tooth number ratio) between these gears may be changed appropriately in accordance with the vehicle characteristics or the like.

As shown in FIGS. 2 and 3, the first gear 42 meshes with both the output gear 22 and the second rotary electric machine output gear 37. In the embodiment, the second rotary electric machine MG2 basically outputs relatively large assist torque for driving the vehicle. Thus, when a comparison is made between the maximum value of torque that may be transferred from the output gear 22 to the first gear 42 and the maximum value of torque that may be transferred from the second rotary electric machine output gear 37 to the first gear 42, the latter is larger than the former. Therefore, in the hybrid drive device 1 according to the embodiment, in order to enable transfer of higher torque, the axial length of the second rotary electric machine output gear 37 is set to be longer than the axial length of the output gear 22. In the embodiment, in order to enable economical and efficient transfer of torque output from the second rotary electric machine MG2 to the first gear 42 while suppressing the axial dimension of the entire hybrid drive device 1, the axial length of the first gear 42 is set to be equal to the axial length of the second rotary electric machine output gear 37. This makes the axial length of the first gear 42 longer than the axial length of the output gear 22. Therefore, the first gear 42 has a portion not meshing with the output gear 22 (hereinafter referred to as "non-meshing portion N" (see FIG. 4)).

The first gear 42 and the output gear 22 are configured to mesh each other such that their respective end portions on the second axial direction side are aligned with each other. In other words, the first gear 42 and the output gear 22 are configured to mesh each other such that all the non-meshing portion N of the first gear 42 is located on the first axial direction side (engine E side) with respect to the output gear 22. In the embodiment, the non-meshing portion N is disposed at a position overlapping, in the axial direction, the first counter bearing 65 which is disposed adjacently on the first axial direction side (engine E side) with respect to the first gear 42. As shown in FIG. 4, the first radially extending wall 4 is formed to be thin in the axial direction at a radial position corresponding to the meshing portion between the output gear 22 and the first gear 42 (or the non-meshing portion N). The non-meshing portion N of the first gear 42 is disposed in a vacant space formed on the radially outer side, which is the counter gear mechanism C side, of the first output projecting portion 6 of the first radially extending wall 4. This enables the counter gear mechanism C to be disposed as close as possible to the first axial direction side (engine E side) by effectively utilizing the vacant space formed on the radially outer side of the first output projecting portion 6. This also enables the second rotary electric machine MG2 and the output differential gear device DF, which are directly drivably coupled to the counter gear mechanism C, to be disposed as close as possible to the first axial direction side (engine E side) accordingly.

3. Arrangement of Various Components of Hybrid Drive Device

Next, the arrangement of various components of the hybrid drive device 1 according to the embodiment will be described. In particular, the arrangement of various constituent parts of the electric drive device 11 will be described.

<Shortening of Axial Length of Distribution Output Member 21>

As described above, the two output support bearings 61 and 62 and the ring gear R are provided on the inner peripheral surface 21b of the distribution output member 21. This facilitates disposing the output gear 22, which is provided on the outer peripheral surface 21a of the distribution output member 21, at a position overlapping the two output support bearings 61 and 62 and the power distribution device PT as viewed in the radial direction. In the embodiment, the output gear 22 is disposed at a position overlapping the first output support bearing 61 as viewed in the radial direction. This makes it possible to reduce the space in which the four components, namely the output gear 22, the output support bearings 61 and 62, and the power distribution device PT, are disposed compared to a case where the output gear 22 overlaps none of the two output support bearings 61 and 62 and the power distribution device PT as viewed in the radial direction.

In addition, the two output support bearings 61 and 62 are disposed separately on both sides of the ring gear R and the power distribution device PT in the axial direction. End surfaces of the distribution output member 21 on both sides in the axial direction are formed to be flush with an end surface of the first output support bearing 61 on the first axial direction side and an end surface of the second output support bearing 62 on the second axial direction side, respectively. In addition, the output gear 22 is disposed between an end surface of the first output support bearing 61 on the first axial direction side and an end surface of the second output support bearing 62 on the second axial direction side in the axial direction. Hence, the axial length of the distribution output member 21 can be reduced to a minimum length matching the axial length of the two output support bearings 61 and 62, which are disposed on the inner peripheral surface 21b, and the power distribution device PT.

In order to dispose the two output support bearings 61 and 62 on both sides of the inner peripheral surface 21b of the distribution output member 21 in the axial direction, the two radially extending walls 4 and 7 and the two output projecting portions 6 and 8 are formed in the case 2. That is, the case 2 includes the two radially extending walls 4 and 7, which are provided on both sides with respect to the distribution output member 21 in the axial direction to extend in the radial direction and formed such that at least radially inner end portions of the radially extending walls 4 and 7 are positioned on the radially inner side with respect to the distribution output member 21, and the two output projecting portions 6 and 8, which are provided on the radially inner side with respect to the distribution output member 21 to project in the axial direction from the two radially extending walls 4 and 7, respectively, toward the distribution output member 21.

The two output support bearings 61 and 62 are disposed between the inner peripheral surface 21b of the distribution output member 21 and the outer peripheral surfaces 6a and 8a of the output projecting portions 6 and 8, respectively. The two output support bearings 61 and 62 support the distribution output member 21 from the radially inner side so as to be rotatable with respect to the output projecting portions 6 and 8.

The root circle diameter of the output gear 22 is larger than both the outside diameter of the two output support bearings 61 and 62 and the root circle diameter of the ring gear R of the power distribution device PT. The output gear 22 is disposed on the radially outer side with respect to the two output support bearings 61 and 62 and the power distribution device PT. Hence, it is possible to secure a high degree of freedom in arrangement of the output gear 22 in the axial direction. In addition, the distribution output member 21 can be formed in a cylindrical shape, which facilitates improving the strength of the distribution output member 21.

The fixation gear 82 is provided on the outer peripheral surface 21a of the distribution output member 21 on the second axial direction side, which is opposite to the first axial direction side on which the output gear 22 is provided. Hence, the fixation gear 82 can be provided by effectively utilizing the outer peripheral surface 21a on the second axial direction side, on which the output gear 22 is not disposed. Hence, an increase in axial length of the distribution output member 21 can be suppressed even if the fixation gear 82 is provided.

<Effective Utilization of Space on Radially Inner Side of Distribution Output Member 21>

The arrangement of various members in a space (hereinafter referred to as "radially inner space") provided on the radially inner side with respect to the distribution output member 21 and overlapping the distribution output member 21 as viewed in the radial direction will be described.

The first rotor shaft 31 of the first rotary electric machine MG1 and the input shaft I occupy the vicinity of the radial center of the radially inner space. The power distribution device PT is disposed on the radially inner side of the ring gear R which is provided around the axial center of the inner peripheral surface 21b of the distribution output member 21 to occupy the vicinity of the axial center of the radially inner space. The two output support bearings 61 and 62 are disposed on the inner peripheral surface 21*b* of the distribution output member 21 adjacently on both sides of the power distribution device PT in the axial direction to occupy the radially inner space on both sides of the power distribution device PT in the axial direction and close to the radially outer side. The first output projecting portion 6 and the first input projecting portion 5 are disposed at a position on the radially inner side with respect to the first output support bearing 61 and overlapping the first output support bearing 61 as viewed in the radial direction to occupy the radially inner space on the first axial direction side of the power distribution device PT and close to the radially inner side. The second output projecting portion 8 is disposed at a position on the radially inner side with respect to the second output support bearing 62 and overlapping the second output support bearing 62 as viewed in the radial direction to occupy the radially inner space on the second axial direction side of the power distribution device PT and close to the radially inner side. Hence, the radially inner space is utilized effectively with no large vacant space left. In other words, various constituent parts of the electric drive device 11 are disposed in the radially inner space in a concentrated manner, which allows the electric drive device 11 to be reduced in axial length and overall size.

<Space on Engine E Side>

Next, the arrangement of various members in a space on the engine E side with respect to the power distribution device PT will be described.

The input shaft I is supported by the first input support bearing 69 supported by the first radially extending wall 4, and the distribution output member 21 is supported by the first output support bearing 61 supported by the first radially extending wall 4. Thus, both the input shaft I and the distribution output member 21 can be supported by the common first radially extending wall 4. In addition, the distribution output member 21 is supported by the first output support bearing 61 from the radially inner side, and the input shaft I is supported by the first input support bearing 69 from the radially outer side. Thus, the first output support bearing 61 and the first input support bearing 69 can be disposed at different radial positions so as to overlap each other as viewed in the radial direction. Hence, the space in which the first output support bearing 61 and the first input support bearing 69 are disposed can be shortened in the axial direction. In addition, as described above, the first output support bearing 61 and the first input support bearing 69 are disposed by effectively utilizing a space on the radially inner side of the distribution output member 21. Hence, the axial spacing between the power distribution device PT and the engine E can be made close to a spacing required for arrangement of a single support bearing. This makes it possible to suppress the axial length of the input shaft I, which drivably couples the engine E and the power distribution device PT to each other, to a short length. This facilitates reducing the thickness of the input shaft I while securing the required strength, and suppressing the axial length of the electric drive device 11 to a short length, which facilitates reducing the size and the weight of the electric drive device 11.

In addition, with the input shaft I and the distribution output member 21 also supported on the first rotary electric machine MG1 side with respect to the power distribution device PT, the input shaft I and the distribution output member 21 can be supported on the engine E side by a single support bearing each. This makes it possible to reduce the axial spacing between the power distribution device PT and the engine E.

<Space on First Rotary Electric Machine MG1 Side>

Next, the arrangement of various members in a space on the first rotary electric machine MG1 side with respect to the power distribution device PT will be described.

The first rotor shaft 31 of the first rotary electric machine MG1 is supported by the first rotary electric machine bearing 63 supported by the second radially extending wall 7, and the distribution output member 21 is supported by the second output support bearing 62 supported by the second radially extending wall 7. Thus, both the first rotor shaft 31 and the distribution output member 21 can be supported by the common second radially extending wall 7. In addition, the distribution output member 21 is supported by the second output support bearing 62 from the radially inner side, and the first rotor shaft 31 is supported by the first rotary electric machine bearing 63 from the radially outer side. Thus, the second output support bearing 62 and the first rotary electric machine bearing 63 can be disposed at different radial positions. In addition, as described above, the second output support bearing 62 is disposed by effectively utilizing a space on the radially inner side of the distribution output member 21. Hence, the axial spacing between the power distribution device PT and the first rotary electric machine MG1 can be suppressed to be small while efficiently disposing the support bearings in the axial spacing.

In addition, the second output support bearing 62 is disposed on the first axial direction side with respect to the second radially extending wall 7, and the first rotary electric machine bearing 63 is disposed on the second axial direction side with respect to the second radially extending wall 7. That is, the second output support bearing 62 and the first rotary electric machine bearing 63 are disposed separately on both sides with respect to the second radially extending wall 7 in the axial direction. This allows the support load to be applied to both sides of the second radially extending wall 7 in the axial direction in a well-balanced manner, which suppresses a warp of the second radially extending wall 7 to one side in the axial direction. In addition, the first rotary electric machine bearing 63 and the second input projecting portion 12 can be disposed by effectively utilizing a space on the radially inner side with respect to a coil end of the first rotary electric machine MG1 that projects in the first axial direction.

In addition, the input shaft I is supported on the first rotary electric machine MG1 side utilizing the inner peripheral surface of the first rotor shaft 31 of the first rotary electric machine MG1. Thus, there is no need to provide a support structure, such as a support wall, exclusively for supporting the input shaft I. Hence, the input shaft I can be supported while suppressing the axial length of the electric drive device 11 to a short length.

<Support Stabilization>

The two output support bearings 61 and 62 are disposed separately on both sides with respect to the ring gear R and the power distribution device PT in the axial direction. Thus, the axial distance between the two output support bearings 61 and 62 can be secured. This facilitates stably supporting the distribution output member 21 so as to suppress runout of the rotational axis of the distribution output member 21, for example.

The input shaft I is also supported by the two input support bearings 69 and 70, which are disposed separately on both sides with respect to the ring gear R and the power distribution device PT in the axial direction. Thus, the axial distance between the two input support bearings 69 and 70 can be secured. This facilitates stably supporting the input shaft 1.

It is not necessary for the extending portion 15 of the input shaft I, which extends in the second axial direction from the distribution coupling portion 51, to transfer torque between the engine E and the power distribution device PT, and the strength of the extending portion 15 can be set to be low. Therefore, the extending portion 15 has a small diameter compared to a region of the input member I between the distribution coupling portion 51 and the engine coupling portion 13. This facilitates reducing the weight of the input shaft I, and also facilitates insertion of the input shaft I into the first rotor shaft 31 of the first rotary electric machine MG1.

<Load Distribution>

The output gear 22 is disposed between an end surface of the first output support bearing 61 on the first axial direction side and an end surface of the second output support bearing 62 on the second axial direction side in the axial direction. Hence, the load acting on the output gear 22 can be appropriately distributed to the first output support bearing 61 and the second output support bearing 62 to be supported.

Figure 5:
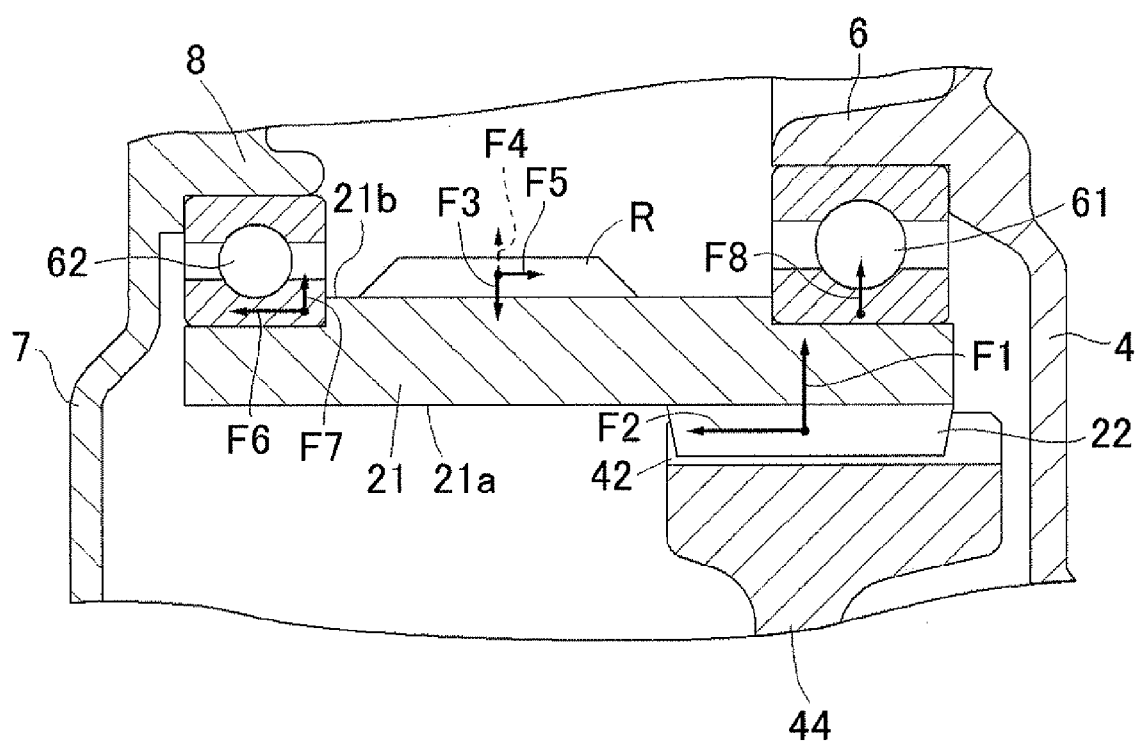
FIG. 5 illustrates the hybrid drive device according to the embodiment of the present invention.

In the embodiment, both the output gear 22 and the ring gear R are formed by a helical gear. As shown in FIG. 5, the output gear 22 is subjected to a thrust load F2 in the second axial direction and a radial load F1 directed radially inward by transfer of torque between the output gear 22 and the first gear 42 of the counter gear mechanism C. In addition, the ring gear R is subjected to a thrust load F5 in the first axial direction and a radial load F3 directed radially outward by transfer of torque between the ring gear R and the plurality of (in the embodiment, four) pinion gears P. Each of the plurality of pinion gears P, which are disposed at equal intervals along the circumferential direction, is subjected to the radial load F3 directed radially outward. Therefore, the respective radial loads F3 cancel out each other so that the two output support bearings 61 and 62 are subjected to no significant radial load. In FIG. 5, a radial load F4 canceled out by the radial load F3 is indicated by a broken arrow. The thrust load F5 is the total of the thrust loads in the first axial direction that act on respective ones of the plurality of pinion gears P. In FIG. 5, the total of such thrust loads is indicated as the thrust load F5.

The total of the thrust load F2 directed in the second axial direction and the thrust load F5 directed in the first axial direction is a thrust load F6 acting on the distribution output member 21 because of the helical gears. The angle of each helical gear is set such that the direction of the thrust load F2 due to the output gear 22 and the direction of the thrust load F5 due to the ring gear R are opposite to each other. Therefore, the distribution output member 21 is subjected to a thrust load with a small magnitude.

In the embodiment, the output gear 22 is disposed on the first axial direction side with respect to the axially central position of the distribution output member 21. Thus, the angle of the teeth of the output gear 22 and the ring gear R is set such that the thrust load acting on the distribution output member 21 is directed in the opposite direction, which is the second axial direction. In other words, the output gear 22 is disposed on the side opposite to the direction of the thrust load acting on the distribution output member 21 due to the helical gears, with respect to the axially central position of the distribution output member 21. In the embodiment, the magnitude of the thrust load F5 due to the ring gear R is smaller than the magnitude of the thrust load F2 due to the output gear 22, and the direction of the thrust load acting on the distribution output member 21 is the second axial direction. The thrust load F6 acts on the second output support bearing 62 which is located on the second axial direction side. The thrust load F6 acting on the distribution output member 21 is directed to the second axial direction side.

Meanwhile, the radial load F1 due to the output gear 22 is distributed in accordance with the respective distances between the output gear 22 and the output support bearings 61 and 62 to act on the output support bearings 61 and 62. In the embodiment, the output gear 22 is disposed on the first axial direction side. Therefore, a radial load F8 distributed to the first output support bearing 61 is higher than a radial load F7 distributed to the second output support bearing 62.

The first output support bearing 61 is subjected to the radial load F8 which is higher than that for the second output support bearing 62. The second output support bearing 62 is subjected to the thrust load F6 which is higher than that for the first output support bearing 61. Hence, both a thrust load and a radial load can be appropriately distributed to the two output support bearings 61 and 62 to be supported. Thus, appropriate output support bearings 61 and 62 can be used in accordance with the type and the magnitude of the load to be supported in order to improve strength or reduce size. In addition, the respective magnitudes of the loads acting on the two output support bearings 61 and 62 can be balanced against each other, which allows the two output support bearings 61 and 62 to be reduced in size in a well-balanced manner.

[Other Embodiments]

Lastly, other embodiments of the present invention will be described. The configuration of each embodiment described below is not limited to its independent application, and may be applied in combination with the configuration of other embodiments unless any contradiction occurs.

(1) In the embodiment described above, the power distribution device PT is formed by a single-pinion planetary gear mechanism. However, the embodiment of the present invention is not limited thereto. That is, the power distribution device PT may be formed by various planetary gear mechanisms such as a double-pinion type planetary gear mechanism and a Ravigneaux planetary gear mechanism. Alternatively, the power distribution device PT may be formed by a differential gear device other than the planetary gear mechanisms such as a differential gear device that uses a bevel gear.

(2) In the embodiment described above, the distribution output member 21 is drivably coupled to the wheels W via the counter gear mechanism C and the output differential gear device DF. However, the embodiment of the present invention is not limited thereto. That is, the distribution output member 21 may be drivably coupled to the wheels W via one or none of the counter gear mechanism C and the output differential gear device DF. Alternatively, the distribution output member 21 may be drivably coupled to the wheels W via other devices such as a speed change mechanism.

(3) In the embodiment described above, the output gear 22, the ring gear R, and the fixation gear 82 are formed integrally with the distribution output member 21. However, the embodiment of the present invention is not limited thereto. That is, one or more of the output gear 22, the ring gear R, and the fixation gear 82 may be formed separately from the distribution output member 21, and coupled to the distribution output member 21. Alternatively, the distribution output member 21 may be formed from a plurality of members.

(4) In the embodiment described above, the output gear 22 is disposed so as to overlap the first output support bearing 61 as viewed in the radial direction. However, the embodiment of the present invention is not limited thereto. That is, the output gear 22 may be disposed so as to overlap at least one of the two output support bearings 61 and 62 and the power distribution device PT as viewed in the radial direction. For example, the output gear 22 may be disposed on the second axial direction side so as to overlap the second output support bearing 62 as viewed in the radial direction. In this case, the fixation gear 82 may be disposed on the first axial direction side, which is opposite to the side on which the output gear 22 is disposed.

(5) In the embodiment described above, the root circle diameter of the output gear 22 is larger than both the outside diameter of the two output support bearings 61 and 62 and the root circle diameter of the ring gear R of the power distribution device PT. However, the embodiment of the present invention is not limited thereto. That is, the root circle diameter of the output gear 22 may be smaller than the outside diameter or the root circle diameter of any of the two output support bearings 61 and 62 and the power distribution device PT that the output gear 22 does not overlap as viewed in the radial direction.

(6) In the embodiment described above, the output gear 22 is disposed between an end surface of the first output support bearing 61 on the first axial direction side and an end surface of the second output support bearing 62 on the second axial direction side in the axial direction. However, the embodiment of the present invention is not limited thereto. That is, a part of the output gear 22 may be disposed on the first axial direction side with respect to an end surface of the first output support bearing 61 on the first axial direction side, or may be disposed on the second axial direction side with respect to an end surface of the second output support bearing 62 on the second axial direction side.

(7) In the embodiment described above, the output gear 22 is disposed on the side opposite to the side to which the thrust load acting on the distribution output member 21 due to the helical gears is directed, with respect to the axially central position of the distribution output member 21. However, the embodiment of the present invention is not limited thereto. That is, the output gear 22 may be disposed on the side to which the thrust load acting on the distribution output member 21 due to the helical gears is directed, with respect to the axially central position of the distribution output member 21. Alternatively, the output gear 22 may be disposed at the axially central position of the distribution output member 21.

In addition, one or both of the output gear 22 and the ring gear R may be a gear other than helical gears such as a spur gear or a herringbone gear. In addition, the direction of the thrust load acting on the output gear 22 and the direction of the thrust load acting on the ring gear R may be the same.

(8) In the embodiment described above, the input member I includes the extending portion 15, which extends in the second axial direction from the distribution coupling portion 51 and which is supported by the inner peripheral surface of the first rotor shaft 31 of the first rotary electric machine MG1. However, the embodiment of the present invention is not limited thereto. That is, the input shaft I may include no extending portion 15, or may include the extending portion 15 which is not inserted into the first rotor shaft 31 of the first rotary electric machine MG1, or which is inserted into the first rotor shaft 31 of the first rotary electric machine MG1 but not supported by the inner peripheral surface of the first rotor shaft 31 of the first rotary electric machine MG1.

(9) In the embodiment described above, the first rotor shaft 31 of the first rotary electric machine MG1 is coupled to the sun gear S serving as a rotary element, and the input shaft I is coupled to the carrier CA serving as a rotary element. However, the embodiment of the present invention is not limited thereto. That is, the first rotor shaft 31 of the first rotary electric machine MG1 and the input shaft I may be coupled to any rotary element of the planetary gear mechanism. For example, the first rotor shaft 31 of the first rotary electric machine MG1 may be coupled to the carrier CA serving as a rotary element, and the input shaft I may be coupled to the sun gear S serving as a rotary element.

(10) In the embodiment described above, the first rotary electric machine bearing 63 is disposed on the second axial direction side with respect to the second output support bearing 62. However, the embodiment of the present invention is not limited thereto. That is, the first rotary electric machine bearing 63 may be disposed adjacently on the second axial direction side of the power distribution device PT so as to overlap the second output support bearing 62 as viewed in the radial direction.

(11) In the embodiment described above, the first output projecting portion 6 and the first input projecting portion 5 are formed as separate projecting portions spaced apart from each other in the radial direction. However, the embodiment of the present invention is not limited thereto. That is, the first output projecting portion 6 and the first input projecting portion 5 may be formed integrally with each other as a single projecting portion.

(12) In the embodiment described above, the distribution output member 21 is formed in a cylindrical shape. However, the embodiment of the present invention is not limited thereto. That is, the distribution output member 21 may include a tubular portion provided in at least a part of the distribution output member 21 in the axial direction. For example, the distribution output member 21 may include a wall portion provided between the two output support bearings 61 and 62 and the power distribution device PT to extend radially inward from the cylindrical portion.

(13) In the embodiment described above, the first output support bearing 61 and the first input support bearing 69 are disposed so as to overlap each other as viewed in the radial direction. However, the embodiment of the present invention is not limited thereto. That is, the first input support bearing 69 and the first output support bearing 61 may be not disposed so as to overlap each other as viewed in the radial direction. For example, the first input support bearing 69 may be disposed on the first axial direction side with respect to the first output support bearing 61. In this case, the first input projecting portion 5 may project in the first axial direction from the first radially extending wall 4.

The present invention may be suitably applied to an electric drive device including an input member drivably coupled to an internal combustion engine, a first rotary electric machine, a second rotary electric machine disposed on an axis different from that of the first rotary electric machine, an output member drivably coupled to wheels and the second rotary electric machine, a power distribution device that distributes torque transferred from the input member to the output member and the first rotary electric machine, and a case.

What is claimed is:

1. An electric drive device including an input member drivably coupled to an internal combustion engine, a first rotary electric machine, a second rotary electric machine disposed on an axis different from that of the first rotary electric machine, an output member drivably coupled to wheels and the second rotary electric machine, a power distribution device that distributes torque transferred from the input member to the output member and the first rotary electric machine, and a case, wherein:

the input member, the output member, the power distribution device, and the first rotary electric machine are disposed coaxially with each other, and the output member and the power distribution device are disposed on a side where the internal combustion engine is provided with respect to the first rotary electric machine in an axial direction of the output member;

the output member includes a tubular portion provided in at least a part of the output member in the axial direction;

the case includes a radially extending portion provided between the power distribution device and the output member and the internal combustion engine in the axial direction to extend in a radial direction of the output member, the radially extending portion being formed such that at least a radially inner end portion of the radially extending portion is positioned on a radially inner side with respect to the tubular portion; and the radially extending portion supports both a first bearing and a second bearing, the first bearing rotatably supporting the input member from a radially outer side, and the second bearing rotatably supporting the tubular portion of the output member from a radially inner side.

2. The electric drive device according to claim 1, wherein the first bearing and the second bearing are disposed so as to overlap each other as viewed in the radial direction.

3. The electric drive device according to claim 1, wherein:
the power distribution device is formed by a planetary gear mechanism, and disposed at a position on a radially inner side with respect to the output member and overlaps the output member as viewed in the radial direction;
an output gear that drivably couples the output member and the wheels to each other is provided on an outer peripheral surface of the output member, and a ring gear of the planetary gear mechanism is provided on an inner peripheral surface of the output member; and
a root circle diameter of the output gear is larger than both a root circle diameter of the ring gear and an outside diameter of the second bearing.

4. The electric drive device according to claim 1, wherein:
the input member includes an internal combustion engine coupling portion coupled to the internal combustion engine, a distribution coupling portion coupled to the power distribution device, and an extending portion that extends from the distribution coupling portion toward the first rotary electric machine along the axial direction;
the extending portion has a small diameter compared to a region of the input member between the distribution coupling portion and the internal combustion engine coupling portion;
a rotary shaft of the first rotary electric machine includes an axial cylindrical portion that is open at an end portion of the rotary shaft on a side where the power distribution device is provided; and
at least a part of the extending portion is inserted into the axial cylindrical portion of the rotary shaft of the first rotary electric machine, and supported in the radial direction so as to be rotatable with respect to an inner peripheral surface of the axial cylindrical portion via a bearing.

5. The electric drive device according to claim 2, wherein:
the power distribution device is formed by a planetary gear mechanism, and disposed at a position on a radially inner side with respect to the output member and overlaps the output member as viewed in the radial direction;
an output gear that drivably couples the output member and the wheels to each other is provided on an outer peripheral surface of the output member, and a ring gear of the planetary gear mechanism is provided on an inner peripheral surface of the output member; and
a root circle diameter of the output gear is larger than both a root circle diameter of the ring gear and an outside diameter of the second bearing.

6. The electric drive device according to claim 5, wherein:
the input member includes an internal combustion engine coupling portion coupled to the internal combustion engine, a distribution coupling portion coupled to the power distribution device, and an extending portion that extends from the distribution coupling portion toward the first rotary electric machine along the axial direction;
the extending portion has a small diameter compared to a region of the input member between the distribution coupling portion and the internal combustion engine coupling portion;
a rotary shaft of the first rotary electric machine includes an axial cylindrical portion that is open at an end portion of the rotary shaft on a side where the power distribution device is provided; and
at least a part of the extending portion is inserted into the axial cylindrical portion of the rotary shaft of the first rotary electric machine, and supported in the radial direction so as to be rotatable with respect to an inner peripheral surface of the axial cylindrical portion via a bearing.

7. The electric drive device according to claim 2, wherein:
the input member includes an internal combustion engine coupling portion coupled to the internal combustion engine, a distribution coupling portion coupled to the power distribution device, and an extending portion that extends from the distribution coupling portion toward the first rotary electric machine along the axial direction;
the extending portion has a small diameter compared to a region of the input member between the distribution coupling portion and the internal combustion engine coupling portion;
a rotary shaft of the first rotary electric machine includes an axial cylindrical portion that is open at an end portion of the rotary shaft on a side where the power distribution device is provided; and
at least a part of the extending portion is inserted into the axial cylindrical portion of the rotary shaft of the first rotary electric machine, and supported in the radial direction so as to be rotatable with respect to an inner peripheral surface of the axial cylindrical portion via a bearing.

8. The electric drive device according to claim 3, wherein:
the input member includes an internal combustion engine coupling portion coupled to the internal combustion engine, a distribution coupling portion coupled to the power distribution device, and an extending portion that extends from the distribution coupling portion toward the first rotary electric machine along the axial direction;
the extending portion has a small diameter compared to a region of the input member between the distribution coupling portion and the internal combustion engine coupling portion;
a rotary shaft of the first rotary electric machine includes an axial cylindrical portion that is open at an end portion of the rotary shaft on a side where the power distribution device is provided; and
at least a part of the extending portion is inserted into the axial cylindrical portion of the rotary shaft of the first rotary electric machine, and supported in the radial direction so as to be rotatable with respect to an inner peripheral surface of the axial cylindrical portion via a bearing.

* * * * *